June 28, 1932.  A. J. DINKEL  1,865,175
RETAINING DEVICE FOR REMOVABLE VEHICLE SEAT CUSHIONS
Filed April 27, 1929
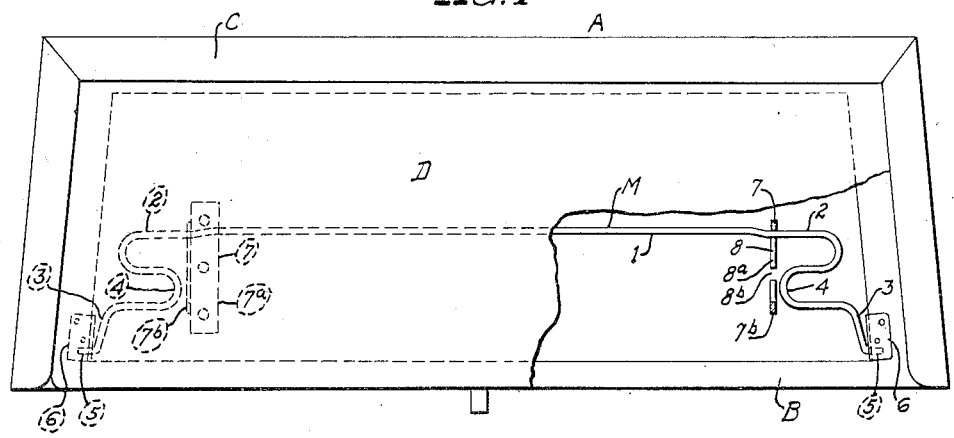
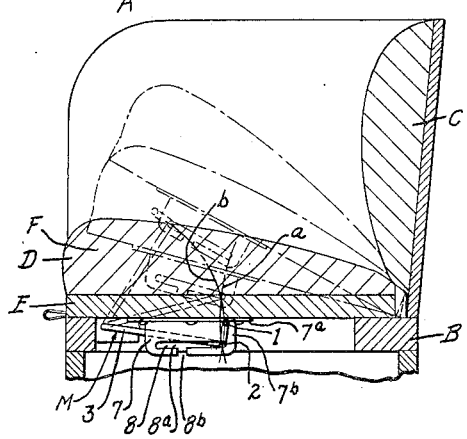
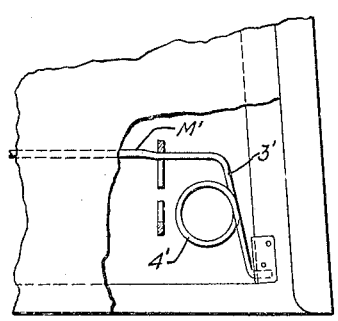
INVENTOR
A. J. DINKEL
BY J. G. Cook
ATTORNEY Patented June 28, 1932

1,865,175

UNITED STATES PATENT OFFICE

ANDREW J. DINKEL, OF YUMA, ARIZONA, ASSIGNOR OF ONE-THIRD TO RICHARD SMITH, OF YUMA, ARIZONA

RETAINING DEVICE FOR REMOVABLE VEHICLE SEAT CUSHIONS

Application filed April 27, 1929. Serial No. 358,499.

This invention relates generally to attachments for vehicle seat cushions of the removable type, and particularly to means adapted for association with such seat cushions whereby same may be maintained in their normal rearward and downward position with respect to their supports, as well as in a raised position when it is desired to remove tools or other articles from beneath the seat cushions, the predominant object of the invention being to provide a simple and inexpensive device for this purpose which will function with the maximum efficiency.

It is well known that removable seat cushions of the type employed particularly in motor vehicles are supported by seat frames, and that in the normal positions of such seat cushions same rest on the frames referred to and are forced rearwardly thereon against the back portions of the seat. Also, it is common knowledge that in many motor vehicles the spaces beneath the seat cushions are reserved for the reception of tools and other articles necessary to the operation of the motor vehicles. It frequently happens that the seat cushions referred to become displaced from their normal positions, whereby the seat is rendered uncomfortable to the occupant thereof, and also it has been found to be troublesome to maintain the seat cushions in an elevated position while removing tools or other articles from the space beneath said seat cushions.

With the foregoing in mind, I have devised a device for maintaining a removable seat cushion of the type referred to in its normal rearward and downward position, and maintaining said seat cushion in an elevated position when it is desired to remove tools and other articles from the space located therebelow. The device disclosed herein is of extremely simple and inexpensive construction and may be readily applied to the seat cushions of new motor vehicles or motor vehicles already in use.

Fig. 1 illustrates a plan view of the seat of a motor vehicle showing my improved device associated therewith.

Fig. 2 is a cross-section of the construction illustrated in Fig. 1.

Fig. 3 is a fragmentary plan view of a modified form of the invention.

In the drawing, wherein is shown for the purpose of illustration, merely, one embodiment of the invention, A designates a motor vehicle seat which comprises a seat frame B, which constitutes a part of the structure of the motor vehicle with which the seat A is associated, a fixed seat back C, and a removable seat cushion D. The seat back C and the seat cushion D are upholstered in the manner common to seat backs and cushions now ordinarily in use, and hence I do not deem it necessary to illustrate or describe these elements in detail herein. All that need be said here is that the seat cushion D comprises a suitable frame E which supports the upholstery F of the cushion in the usual manner. The normal position of the seat cushion, and the position in which same must be maintained for comfort to the occupant thereof, is as shown in Fig. 1, that is, with the frame E of the cushion in close contact with the seat frame B and with the rear face of the cushion in close contact with the seat back C. In other words, in its proper position the seat cushion must be maintained downwardly and rearwardly with respect to the seat frame B.

For the purpose of maintaining a removable seat cushion in the position referred to, I have provided the device disclosed herein, which comprises a member M formed of material possessed of considerable resiliency or spring. The member M includes a bar portion 1 which extends longitudinally of the seat cushion D, and adjacent to the opposite ends of the members M the longitudinally extended bar 1 is bent to provide portions 2 which are disposed in offset relation with respect to the main portion of the longitudinally extended bar 1. The member M includes side portions 3, each of which is provided with a substantially U-shaped bent portion 4, and at the outer ends of the side portions 3 each thereof is provided with an offset portion 5 (Fig. 1). The offset portions 5 at the outer ends of the side portions 3 are extended into apertures formed in attaching elements 6 secured to the seat frame B at opposite ends of the seat, said offset portions being rockable within said apertures whereby the member M is pivotally connected to said attaching elements.

Secured to the frame E of the seat cushion D is a pair of connectors 7, each of said connectors comprising a member which is angular in cross-section. The connectors each comprise a portion 7ª which is disposed flat against the seat cushion frame E and through which fastening devices pass to secure same to the seat cushion frame, and a portion 7ᵇ extended outwardly from the seat cushion frame at an approximate right angle thereto. The portion 7ᵇ of each connector is provided with a substantially T-shaped slot 8. The portions 2 of the longitudinally extended bar 1 pass through the main portion 8ª of the T-shaped slots formed in the connectors 7, the short open end slot portions 8ᵇ of said T-shaped slots providing for the insertion or removal of the bar portions 2 into and from the T-slots.

When the seat cushion D is in the position in which same is shown by dotted lines in Fig. 2 and said seat cushion is moved downwardly into the full line position of the seat cushion in said view, the rear end of the T-shaped slots wherein the portions 2 of the longitudinally extended bar 1 of the member M are seated during downward movement of the seat cushion will swing in an arc of a circle about the rear end of the seat cushion which constitutes the pivoted point of said seat cushion during such downward movement thereof, this arc of a circle being indicated by the dot and dash line a in Fig. 2. Also, during the downward movement of the seat cushion D the member M will pivot about the offset portions 5 at the outer ends of the side portions of said member, and hence the portions 2 of said member will move in an arc of a circle indicated by the dot and dash line b in Fig. 2, which arc of a circle is different from that on which the rear end of the T-shaped slots move. The result of this situation is that the bar 1 is moved slightly toward the axis of the offset portions 5 with the result that the bent portions of the side portions 3 of the member M will be placed under compression, whereby pressure will be exerted by said bent portions in a direction rearwardly of the seat cushion. This rearward pressure exerted by the bent portions of the member M will force the seat cushion D rearwardly with respect to the seat frame B, and when the portions 2 of the member are moved to their normal position, which is in a lower horizontal plane than the offset portions 5, downward pressure as well as rearward pressure will be exerted against the rear wall portions of the T-shaped slots 8. The result of this situation is that the seat cushion will be forcibly moved rearwardly and downwardly by the member M, whereby said seat cushion will be maintained in its proper position. Because of the arcs on which the rear portions of the T-shaped slots 8 and the portions 2 of the member M move the tension exerted by the bent portions 4 of said member M is increased when the seat cushion is moved to an elevated position, and this situation effectively prevents accidental elevation of said seat cushions, and serves to lock the seat cushion in its lowered and rearward position.

When it is desired to maintain the seat cushion in the elevated position, which is the uppermost position in which same is shown by dotted lines in Fig. 2, the member M serves as a prop for this purpose and therefore free access may be had to the space beneath the seat cushion without the necessity of holding the seat cushion elevated. When the seat cushion is elevated as described, the portions 2 of the member M are moved to the front portions of the slots 8 so as to obtain the maximum elevation of the seat cushion.

When the seat cushion D is in its lowered position the portion of the longitudinally extended bar located between the portions 2 thereof contacts firmly with the bottom face of the frame of the seat cushion, as shown clearly by full lines in Fig. 2, whereby the rigidity of the entire structure is increased.

In the modification illustrated in Fig. 3 the bent portions 4' forming parts of the side portions 3' of the member M' are in the form of a loop or coil, instead of in U-shaped form as shown in Fig. 1.

I claim:

1. In combination with a seat cushion mounted on a support in such manner that the rear edge of said seat cushion contacts firmly with a portion of said support, means for maintaining said seat cushion in its proper downward and rearward position with respect to its support, comprising a resilient member attached to the seat support, and slotted means for connecting said member to the seat cushion, said slotted means being located lower than the point at which said member is attached to the support and lower than the point at which the rear edge of the seat cushion contacts with said support, whereby downward and rearward pressure is exerted against said seat cushion by said member to provide a toggle action when the seat cushion is in its normal position.

2. In combination with a seat cushion mounted on a support in such manner that the rear edge of the seat cushion contacts firmly with a portion of said support, means for maintaining said seat cushion in its proper downward and rearward position with respect to its support comprising a resilient member attached to the seat support, and a member secured to said seat cushion for connecting said resilient member thereto, the last-mentioned member being provided with a slot having an opening leading thereto and said member being located lower than the point at which the resilient member is attached to the seat support and lower than the point at which the rear edge of the seat cushion contacts with said seat support, whereby rearward and downward pressure is exerted against said seat cushion by said resilient member to provide a toggle action when the seat cushion is in its normal position.

3. In combination with a seat cushion mounted on a support in such manner that the rear edge of said seat cushion contacts firmly with a portion of said support, means for maintaining said seat cushion in its proper downward and rearward position with respect to its support comprising a resilient member attached to the said support, and a member secured to said seat cushion for connecting said resilient member thereto, the last-mentioned member being provided with a substantially T-shaped slot which receives a portion of said resilient member, and said member being located lower than the point at which said resilient member is attached to the seat support and lower than the point at which the rear edge of the seat cushion contacts with said seat support, whereby rearward and downward pressure is exerted against said seat cushion by said member to provide a toggle action when the seat cushion is in its normal position.

In testimony that I claim the foregoing I hereunto affix my signature.

ANDREW J. DINKEL.